United States Patent [19]

Lucas

[11] Patent Number: 4,885,775
[45] Date of Patent: * Dec. 5, 1989

[54] INFORMATION DISPLAY SCHEME FOR SUBSCRIBERS OF A SUBSCRIPTION TELEVISION SYSTEM

[75] Inventor: Keith Lucas, Oak Ridges, Canada

[73] Assignee: Scientific-Atlanta, Inc., Atlanta, Ga.

[*] Notice: The portion of the term of this patent subsequent to May 9, 2006 has been disclaimed.

[21] Appl. No.: 653,061

[22] Filed: Sep. 21, 1984

[51] Int. Cl.[4] .............................................. H04N 7/167
[52] U.S. Cl. ........................................ 380/10; 358/86; 455/6
[58] Field of Search ........................... 358/84, 86, 115; 179/20 P; 379/95, 96; 455/2-6

[56] References Cited

U.S. PATENT DOCUMENTS

| | | | |
|---|---|---|---|
| Re. 30,773 | 10/1981 | Glaser et al. | 235/379 |
| 3,728,480 | 4/1973 | Baer | 273/101.1 |
| 3,989,899 | 11/1976 | Norwich | 179/20 P |
| 4,052,719 | 10/1977 | Hutt et al. | 340/324 AD |
| 4,138,726 | 2/1979 | Girault et al. | 364/521 |
| 4,205,343 | 5/1980 | Barrett | 380/18 |
| 4,225,884 | 9/1980 | Block et al. | 380/20 |
| 4,245,245 | 1/1981 | Matsumoto et al. | 380/7 |
| 4,323,921 | 4/1982 | Guillou | 380/18 |
| 4,337,483 | 6/1982 | Guillou | 380/20 |
| 4,388,643 | 6/1983 | Aminetzah | 380/20 |
| 4,393,404 | 7/1983 | Cox et al. | 358/147 |
| 4,484,027 | 11/1984 | Lee et al. | 380/21 |
| 4,484,217 | 11/1984 | Block et al. | 358/84 |
| 4,531,020 | 7/1985 | Wechselberger et al. | 380/21 |
| 4,536,791 | 8/1985 | Campbell et al. | 358/86 |
| 4,595,950 | 6/1986 | Lofberg | 380/5 |
| 4,599,647 | 7/1986 | George et al. | 380/10 |
| 4,613,901 | 9/1986 | Gilhousen et al. | 380/20 |
| 4,623,920 | 11/1986 | Dufresne et al. | 380/20 |
| 4,694,490 | 9/1987 | Harvey et al. | 380/20 |
| 4,704,725 | 11/1987 | Harvey et al. | 380/9 |
| 4,709,725 | 11/1987 | Morrison | 137/614.04 |

FOREIGN PATENT DOCUMENTS

| | | |
|---|---|---|
| 128555 | 12/1984 | European Pat. Off. . |
| 0149746 | 7/1985 | European Pat. Off. . |
| 86/01962 | 3/1986 | PCT Int'l Appl. . |

OTHER PUBLICATIONS

Series 9700 B–MAC Digital Decoder 525–Line System, Technical Manual, Digital Video Systems Corp., DVS Part No. 707-042, 1987.
Journal of the SMPTE, 11/84, pp. 1034–1043.
CCIR Study Group Report Document 10–11S–E, 9/23/83, "Satellite Transmission of Multiplexed Analogue Component", (MAC, Television Signals).
Journal of the SMPTE, 10/84, Gerald Chouinard and John N. Barry, pp. 930–942, "NTSC and MAC Television Signals in Noise and Interference Environments".
ORACLE, SMPTE Journal, vol. 83, 1/74, by G. A. McKenzie, pp. 6–10, "An Information Broadcasting Service Using Data Transmission in the Vertical Interval".
Wireless World, 5/73, p. 222, "TV Information Service Signal Format for B.B.C. System".
Wireless World, 7/73, pp. 314–316, by A. James, "ORACEL—Broadcasting the Written Word".
SMPTE Journal, 11/84, pp. 1034–1043, by John D. Lowry, "B-Mac: An Optimum Format for Satellite Television Transmission".

Primary Examiner—Thomas H. Tarcza
Assistant Examiner—Bernarr Earl Gregory
Attorney, Agent, or Firm—Banner, Birch, McKie & Beckett

[57] ABSTRACT

An information display scheme for displaying subscriber unique information to subscribers of a subscription communications system. The system comprises template page receiving means coupled to the communications system for receiving a template page as a format for the subscriber unique information, storage means coupled to the template page receiving means for storing the template page and logic means coupled to the communications system and to the storage means for locally generating and maintaining at least some of the subscriber unique information. The logic means combines the subscriber unique information with the template page for display to the subscriber.

18 Claims, 5 Drawing Sheets

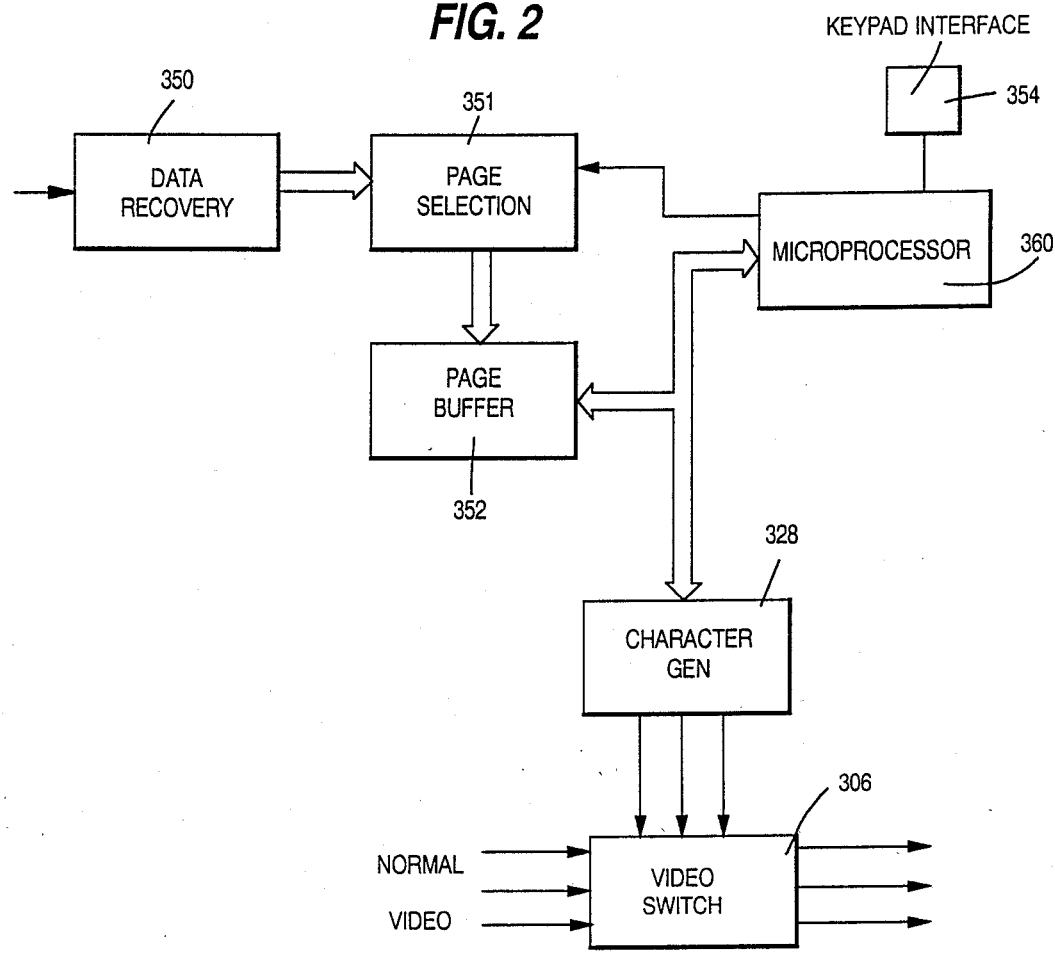

FIG. 4

CONTROL PAGE

YOUR PARENTAL CONTROL IS SET AT [2]
YOUR BUY BUTTON IS [LOCKED] ◄——— A
PRESS UP ARROW FOR PIN CHANGE

TO CHANGE RESTRICTIONS
PRESS NUMERAL(S) BELOW:

0 - UNRESTRICTED
1 - NO R RATED OR ABOVE
2 - NO PG RATED OR ABOVE

8 - LOCK BUY BUTTON
9 - UNLOCK BUY BUTTON

B { (bracket encompassing the above content)

FIG. 5

B { SPECIALS VIEWED }

| DATE | TITLE | COST |
|------|-------|------|
| 03/7 | TERMS OF ENDEARMENT | $4.00 |
| 03/7 | BOSTON SYMPHONY | $3.25 |
| 03/6 | E. T. | $4.50 |
| 03/6 | THE GREAT WAR #3 | [****] ◄— A |
| 03/6 | FISHIN MUSICIAN | $0.50 |
| 03/6 | THE GREAT WAR #2 | [****] ◄— A |

**** PROGRAM NOT PURCHASED
FOR MORE PRESS UP-ARROW

INFORMATION DISPLAY SCHEME FOR SUBSCRIBERS OF A SUBSCRIPTION TELEVISION SYSTEM

BACKGROUND OF THE INVENTION

The present invention relates generally to the field of subscription communication systems and, more particularly, is directed to an information display scheme which simplifies the display of information to subscribers of a subscription communication system.

Subscription communications systems, such as television and special events programming, have gained widespread acceptance as an efficient way of providing a vast selection of information and entertainment programming to the public. Such systems normally charge a fixed monthly service fee which entitles the subscriber to receive regular programming for the entire month. Many systems also provide a "movie channel" or a "special events channel" for an additional fee. Though a subscriber may wish to view only one or two movies or special events during the course of a month, he must nevertheless pay the full additional fee. Payment of a full fee where only a fraction of the service is utilized is uneconomical and often results in a majority of subscribers signing up to receive only regular programming. Thus other services are not sufficiently supported to provide quality programming.

A subscription television system should include provisions for a subscriber not only to select which channels he wishes to receive, but also to select which programs on a particular channel he wishes to view. In order to achieve maximum flexibility, the subscriber should also be permitted to make this selection at anytime without having to indicate to the broadcaster or system operator beforehand that he wishes to view a particular program. Ideally, the system should make all programming available to the subscriber and permit him to select and pay for only those programs that he actually views. This concept is often called "pay-per-program".

In a subscription television system having a pay-per-program feature, the system operator must be continuously informed of the programs selected for viewing by the subscriber for proper billing. Thus, such systems require an up-link or some form of communication from the subscriber to the system operator. Subscribers could, of course, maintain a log of all programs viewed and periodically send the log to the system operator for billing purposes. The integrity of such a billing procedure is suspect, however, and is impractical for a system having many subscribers. On-line feedback to the system operator of programs selected for viewing by the subscriber is also possible but such feedback provisions greatly complicate and increase the cost of the system.

In subscription television systems having a pay-per-program feature, the subscriber must also be kept apprised of his account status. Such information could be provided by a conventional teletext system where all the digital pulses which represent data are transmitted from the headend of the system on lines of the vertical blanking interval of the television signals. This data represents alphanumeric and graphical information which may be selectively displayed to the subscriber using a television receiver adapted for teletext reception. Typically, the subscriber requests a particular magazine page of information for display using a remote keypad interfaced to the teletext receiver. The receiver waits until the requested page is transmitted in the channel then captures the information in a page storage buffer. The contents of the buffer are displayed through a character generator onto the television screen.

In teletext systems known in the prior art, no significant modifications are made to the transmitted pages prior to their display on the screen other than, perhaps, the addition of a page number in a fixed position on certain pages. In particular, conventional teletext systems do not provide for the addition of locally generated information by the receiver which might change the meaning or the interpretation of the transmitted information. Thus, information that is specifically directed to a particular subscriber, for example billing information, must always be completely generated at the headend or distributor end for down loading to the subscriber. This adds to the complexity of the system. Thus, in systems having a pay-per-program feature, means must still be provided for communicating to the system operator a listing of programs watched by the subscriber. Such a requirement further increases the complexity and cost of the system.

SUMMARY OF THE INVENTION

It is the overall object of the present invention to provide an information display scheme which simplifies the display of information to subscribers of a subscription communication system.

It is a specific object of the present invention to provide an information display scheme for subscribers of a subscription communication system which uses a template page transmitted from the headend of the system as a format for the display of locally generated information.

It is another specific object of the present invention to provide an information display scheme for subscribers of a subscription communication system which uses a template page transmitted from the headend of the system as a format for the display of locally generated customer unique information such as a billing summary of the subscriber's receiver.

It is a still further specific object of the present invention to provide an information display scheme for subscribers of a subscription communication system which uses a template page transmitted from the headend of the system as a format for the display of parameters associated with the status of the system.

It is a further specific object of the present invention to provide an improved billing system for a subscription communication system which permits the subscriber to select and pay for only those programs that the subscriber actually views.

It is a still further object of the present invention to provide an improved billing system for a subscription communication system which permits the subscriber to select and pay for programs the subscriber wishes to view without having to communicate beforehand with the system operator.

It is another specific object of the present invention to provide an improved billing system for a subscription communication system which permits the subscriber to obtain on demand a summary of the subscriber's billing account information.

It is a still further specific object of the present invention to provide an information display scheme for subscribers of a subscription communication system which uses a template page transmitted from the headend of the system as a format for the display of locally generated information, the same template page being used for many subscribers.

The present invention has particular application in subscription television systems which transmit television programs in the form of scrambled signals to a decoder in the subscriber's home. A secure microprocessor within the decoder determines which signals are unscrambled for viewing dependent on the program selected by the subscriber and the status of the subscriber's account maintained by the microprocessor. The microprocessor is loaded with account data from the headend of the system which reflects service fees prepaid by the subscriber. The cost of programs selected for viewing are automatically subtracted from the subscriber's account balance maintained by the microprocessor. Where the balance is insufficient to cover the cost of the program or exceeds an authorized credit limit, the microprocessor prevents the program from being descrambled. The subscriber's account balance may be increased by the subscriber sending to the system operator additional pre-pair service fees.

The billing account information maintained by the microprocessor is readily available for display to the subscriber and may be combined with a template page transmitted from the headend of the system over a convenient channel as a report format. For example, the template page may consist of nothing more than column headings for a billing summary.

Further objects, features and other aspects of the present invention will be understood from the detailed description of the preferred embodiment of the invention with reference to the annexed drawings.

BRIEF DESCRIPTION OF THE DRAWINGS

FIG. 2 is a block diagram of a template page scheme as a format for displaying locally generated information in accordance with the present invention.

FIGS. 3, 4 and 5 are examples of displays of locally generated infromation on a template page in accordance with the present invention.

DETAILED DESCRIPTION OF THE PREFERRED EMBODIMENT

Figure 1:
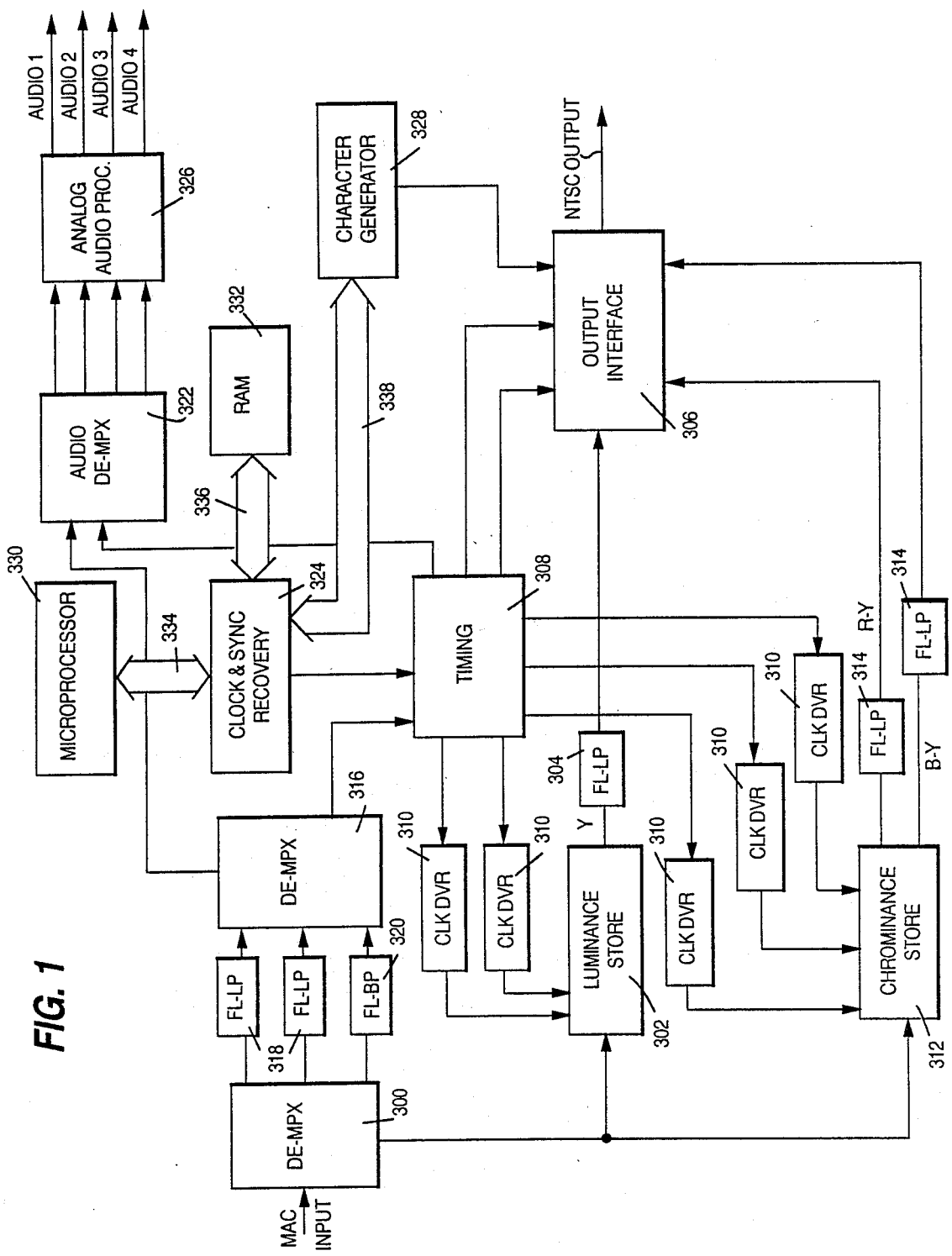
FIG. 1 is a block diagram of a subscription television decoder with a secure microprocessor in accordance with the present invention.

With reference to FIG. 1, a block diagram is provided showing one example of a decoder for a subscription television system which includes a microprocessor for controlling the operation of the decoder as well as maintaining the subscriber's billing information. A further example of such a decoder is described in commonly assigned U.S. patent application Ser. No. 507,565 entitled "Encryption and Decryption of Video Signals" filed June 24, 1983.

As shown in FIG. 1, the MAC television signal first enters the multiplexer 300, which separates from it the luminance and chrominance signals as well as the audio, synchronization, timing and teletext information. The luminance signal is delivered to luminance store 302, a CCD line store, where it is decompressed, and then to low-pass filter 304, where it is filtered. The analog luminance signal then goes to output interface 306. The sampling signals necessary to decompress luminance are produced in timing generator 308 and supplied to luminance store 302 by two clock drivers 310.

The chrominanace signal from demultiplexer 300 is also decompressed in chrominance store 312, which is also a CCD line store. Separate outputs are provided for the two color difference signals, which are filtered in two low-pass filters 314 and then supplied to output interface 306. The necessary sampling signals are supplied to chrominance store 312 from timing generator 308 through three clock drivers 310.

Signals not constituting luminance or chrominance are also separated from the MAC television signal by demultiplexer 300. These signals include audio, teletext and synchronization and timing information. Audio, teletext, and synchronization signals are delivered to demultiplexer 316 through one of two low-pass filters 318; while the fixed-frequency timing information is delivered to demultiplexer 316 through band-pass filter 320. Demultiplexer 316 separates these signals, supplying the audio to audio demultiplexer 322 and the synchronization and timing signals to clock and synchronization recovery circuit 324 and timing generator 308. Audio information from demultiplexer 316 is separated into four channels in audio demultiplexer 322 and output by analog audio processor 326. Teletext information is sent to character generator 328 via clock and synchronization recovery circuitry 324. Decoder operations are under the control of microprocessor 330, which communicates with clock and synchronization recovery circuit 324, teletext character generator 328, and RAM 332 over bidirectional buses 334, 336, and 338.

Output interface 306 receives teletext characters from character generator 326, luminance from low-pass filter 304, chrominance from low-pass filter 314, and timing signals from timing generator 308. Its output is a standard NTSC color television signal.

FIG. 2 is a block diagram of the template page scheme in accordance with the present invention. As shown, microprocessor 360 can be used to replace micrprocessor 330 shown in FIG. 1 to also control the operations of a decoder. Block 350 of FIG. 2 is a data recovery unit which recovers information data and template page data from a data channel in the decoder, as for example the decoder shown in FIG. 1. The recovered data from data recovery unit 350 is supplied to page selection unit 351 which selects data for storage in page buffer 352. Microprocessor 360 is coupled to page selection unit 351 and page buffer 352 to also control the selection of data for storage in page buffer 352. Keypad interface 354 is coupled to microprocessor 360 for interfacing a keypad, or other device operable by the subscriber, to control the operation of the microprocessor and to indicate to the microprocessor such information as which programs the subscriber wishes to view. Microprocessor 360 is also coupled to character generator 328, also shown in FIG. 1, which processes infromation from page buffer 352 and microprocessor 360 for display on the television screen via output interface 306 shown in FIG. 1 as well. Output interface 206 may be controlled to select for output to the television screen normal television video signals or textual video signals from character generator 328.

In a subscription television system having a pay-per-program feature in accordance with the present invention, the subscriber mails in to, or otherwise deposits with, the operator of the system an amount of money equal to the fixed monthly service fee plus an additional amount to be held in reserve for the subscriber which he may draw against to view special programs not included in regular programming under the fixed monthly fee. The operator then transmits signals over the channel to the particular subscriber which indicates how much money was received from the subscriber. This information is stored in secure microprocessor 360. Microprocessor 360 includes account balance means for maintaining the subscriber's account balance which is updated by the payment information received from the system operator. The microprocessor also includes means for determining the cost of programs available for viewing by the subscriber.

This cost information may also be transmitted by the system operator to the microprocessor and stored therein.

The cost of programs selected for viewing by the subscriber are automatically subtracted from the subscriber's balance maintained by the microprocessor. When the balance is insufficient to cover the cost of the program, or exceeds a predetermined credit limit, the microprocessor prevents the program transmitted over the channel from being descrambled. Microprocessor 360 also sets an internal flag associated with each program selected for viewing. The subscriber's account balance may be increased by the subscriber pre-paying additional service fees.

FIG. 4–5 illustrate various reports or page displays that the subscriber may command microprocessor 360 via keypad interface 354 to display on the television screen. FIG. 4 illustrates a display showing the subscriber's billing account status. In this example, the display comprises Part A enclosed in a box and Part B. The box is drawn around Part A to set it apart from Part B for purposes of explanation. Note that the information contained in Part B is descriptive information or headings and is the same for each subscriber. Part B thus serves as a template or heading for the information unique to each subscriber contained in Part A. Since Part B is the same for many subscribers, it may be efficiently transmitted over a teletext or other channel in the system to these subscribers at the same time. The information contained in part A on the other hand, is unique to each subscriber and may be more efficiently generated and maintained by microprocessor 360 coupled to the decoder in each subscriber's home.

FIG. 5 illustrates a display showing a system control page indicating the status of various parameters associated with the decoder. Here again, the display is divided into Parts A and B for purposes of explanation. As described above with respect to FIG. 4, Part B, is descriptive information serving as a template or format for the information contained in Part A and is the same for many subscribers. The information in Part A is provided by microprocessor 360.

FIG. 5 is a further example of a display in accordance with the present invention similarly divided into Parts A and B as above described. This display lists the number of special programs viewed and their costs. In order to generate this display, the template page includes a listing of all programs made available to the subscriber and their costs. As the list is received by microprocessor 360, it determines which programs do not have a corresponding internal flag set indicating that those programs were not selected for viewing by the subscriber. The cost figure for these programs is overprinted in the display with "****" indicating that the programs were not purchased.

As FIGS. 4–5 illustrate, the information display system in accordance with the present invention effectively utilizes a template or format scheme to display information not unique to a specific subscriber. Because this type of information is the same for many subscribers, rather than being generated locally for each subscriber, it can be transmitted to everyone at the same time from the main distribution point for the system. The information that is unique to each subscriber, however, is more efficiently generated and maintained by the microprocessor coupled to the decoder in each subscriber's home. Thus, the present invention avoids having to send subscriber unique information from the headend of the system for each subscriber. In a large system, e.g., in a system using a satellite to reach millions of subscribers, the benefits of not having to provide from the headend all subscriber unique information are substantial.

The information display system of the present invention overcomes the above noted difficiencies in subscription television systems known in the prior art which have a pay-per-program feature. In conventional systems, it is necessary that an up link, e.g., by telephone, or some other form of feedback communication be provided from the subscriber to the system operator to that the subscriber is correctly billed for the programs viewed. In the system of the present invention, no feedback to the system operator of any kind is required. The system always operates in a download mode. Thus, the system is less complicated and easier to maintain. Moreover, because the microprocessor coupled to the decoder in the subscriber's home does all of the housekeeping functions with respect to which programs are selected for viewing and automatically subtracts the cost of the programs from the subscriber's account balance, the system is less burdened and can be more fully utilized to provide additional programming. The system of the present invention also permits the status of the decoder to be continuously monitored and displayed to the subscriber.

The present invention has been described in detail in connection with a preferred embodiment. The embodiment, however, is merely an example and the invention is not restricted thereto. It will be understood by those skilled in the art from a reading of the specification that variations and modifications can be made within the scope of the present invention as defined by the appended claims.

I claim:

1. An information display system for use in communication system for displaying at a receiver subscriber information which is unique to each subscriber and integrated with common information generated and communicated in real time from a remote location, said common information being common to a plurality of subscribers and including a template page, the information display system comprising:

display means coupled to the communications system for displaying at the receiver both said subscriber information and said common information;

template page receiving means coupled to a communications system for receiving said template page as a display format for the subscriber information, wherein said template page includes displayable descriptive information for identifying and describing corresponding portions of said subscriber information;

storage means coupled to said template page receiving means for storing said template page;

logic means coupled to the communications system, to the display means and to said storage means for locally generating and maintaining all of the subscriber unique information, said logic means retrieving said template page from said storage means and integrating said subscriber information with said template page for display on said display means, wherein said logic means arranges and positions said descriptive information adjacent said corresponding portions of said subscriber information.

2. The information display system of claim 1 wherein said logic means is a microprocessor.

3. The information display system of claim 1 wherein said subscriber information includes billing information for the subscriber.

4. The information display system of claim 1 wherein said subscriber unique information includes system status information.

5. The information display system of claim 1 wherein said template page is transmitted over a teletext channel of the communications system.

6. The information display system of claim 1 wherein said storage means stores said template page only so long as required to display said subscriber information and said common information.

7. The information display system of claim 6 wherein said subscriber information and said common information are selectively displayed by said display means and wherein for each display of said subscriber information and said common information said storage means received and stores said template page.

8. In a subscription television system having means for transmitting a scrambled video signal representing television programs to a descrambling decoder and television receiving means for receiving a descrambled signal from the decoder, an information display system for displaying at a receiver subscriber information on said television receiving means, said subscriber information being unique to each subscriber and being integrated with common information generated and communicated in real time from a remote location and said common information being common to a plurality of subscribers of said subscription television system and including a template page, said display system comprising:
template page receiving means coupled to said decoder for receiving said template page as a display format for the subscriber information, wherein said template page includes displayable descriptive information for identifying and describing corresponding portions of said subscriber information;
storage means coupled to said template page receiving means for storing said template page;
logic means coupled to said decoder and to said storage means for generating said subscriber information, said logic means retrieving said template page from said storage means and integrating said subscriber information with said template page for display on said television receiving means, wherein said logic means arranges and positions said descriptive information adjacent to said corresponding portions of said subscriber information.

9. The information display system of claim 8 further including input means coupled to said logic means for selecting television programs for viewing by the subscriber, said logic means includes means for storing a log of selected programs.

10. The information display system of claim 9 wherein said logic means compares each entry of said log with said template page and displays said subscriber information depending on the result of the comparison, said subscriber information indicating which programs were selected by the subscriber.

11. The information display system of claim 9 wherein said logic means includes means for generating billing information for the subscriber dependent on the programs selected for viewing, wherein said subscriber information includes said billing information.

12. The information display system of claim 8 wherein said logic means includes
account balance means for maintaining an account balance and receiving a payment signal representing a payment made by the subscriber;
program selection means for receiving a program signal representing a program selected for viewing by the subscriber;
cost means coupled to said program selection means for providing a cost signal representing the cost of the program selected by the subscriber;
arithmetic means coupled to said account balance mans and said cost means for subtracting said cost signal from said account balance and for adding said payment signal to said account balance;
comparison means coupled to said account balance means for providing a comparison signal when said account balance is below a predetermined value; and
inhibitor means responsive to said comparison signal for inhibiting descrambling when the comparison signal is present.

13. A method of displaying at a receiver subscriber information to subscribers of a subscription communications system, said subscriber information being unique to each subscriber and being integrated with common information generated and communicated in real time from a remote location and said common information being common to a plurality of subscribers of said subscription communications system and including a template page, the method comprising the steps of:
locally generating and maintaining at least some of said subscriber information;
providing displayable descriptive information in said template page for identifying and describing corresponding portions of said subscriber information as a display format for said subscriber information;
temporarily storing said template page;
retrieving said template page from storage; and
integrating said corresponding portions of said subscriber information with said template page for display to the subscriber.

14. The method of claim 13 wherein said step of temporarily storing said template page includes the step of deleting said template page from storage after said subscriber information and said common information are displayed.

15. The method of claim 14 wherein said step of integrating said subscriber information with said common information for display includes the step of selectively displaying said subscriber information and said common information and the step of temporarily storing said template page for each display.

16. The method of claim 13 wherein said step of locally generating at least some of the subscriber information includes the step of locally generating billing information for the subscriber.

17. The method of claim 16 wherein said step of locally generating billing information for the subscriber includes the steps of
maintaining an account balance for the subscriber;
subtracting from said account balance the cost of programs selected for viewing by the subscriber; and
adding to said account balance payments made by the subscriber.

18. The method of claim 13 wherein said step of locally generating at least some of the subscriber information includes the step of locally generating system status information.

* * * * *